Feb. 3, 1970  R. E. LATHAM ET AL  3,492,866
WELL TUBING BEHAVIOR MEASUREMENT APPARATUS AND METHOD
Filed June 14, 1967  5 Sheets-Sheet 1

INVENTORS
RAYMOND E LATHAM
OSCAR DANE III
BY CHARLES D RATLIFF

Cushman, Darby & Cushman
ATTORNEYS

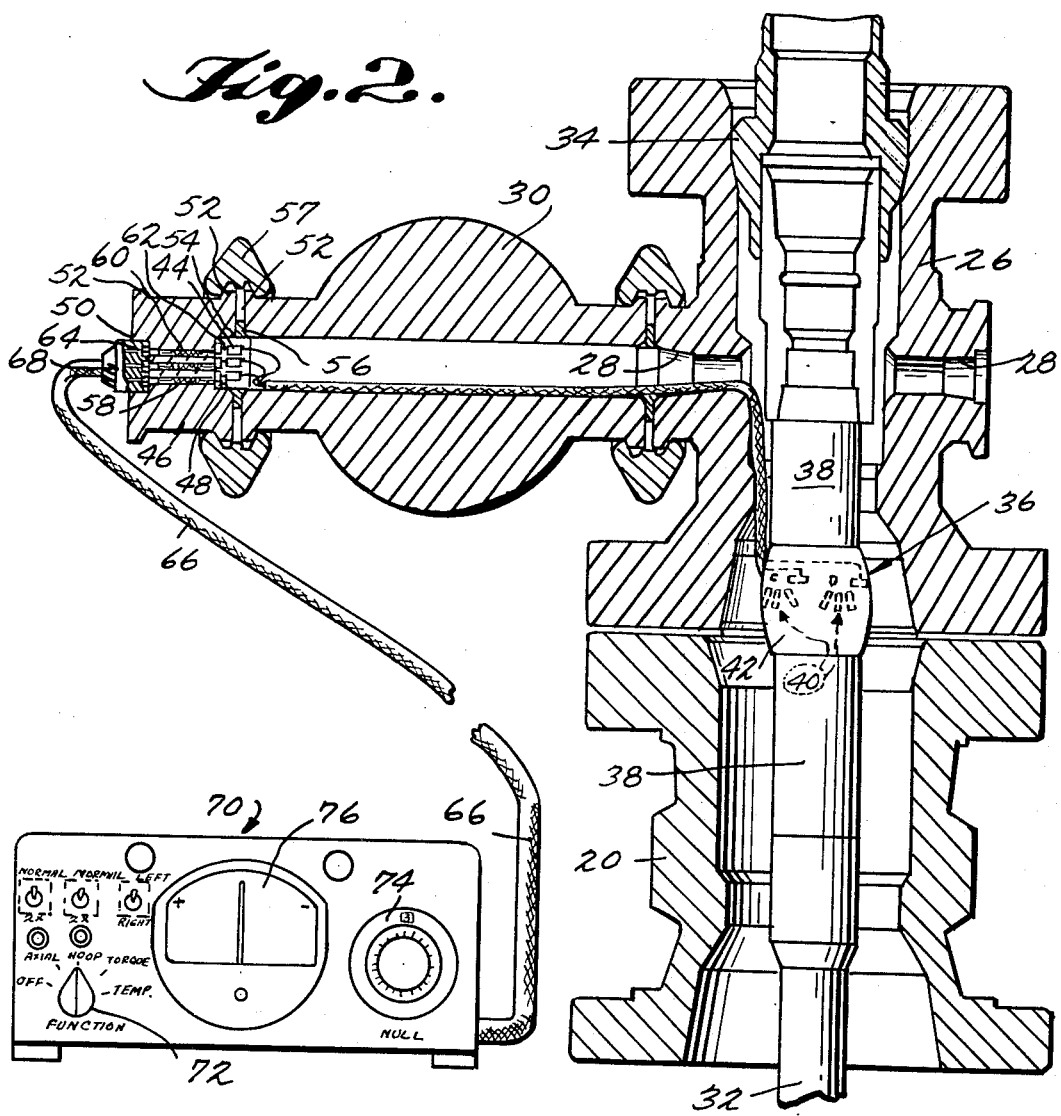
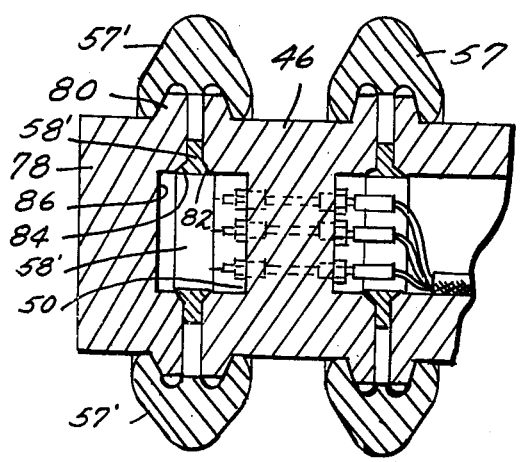

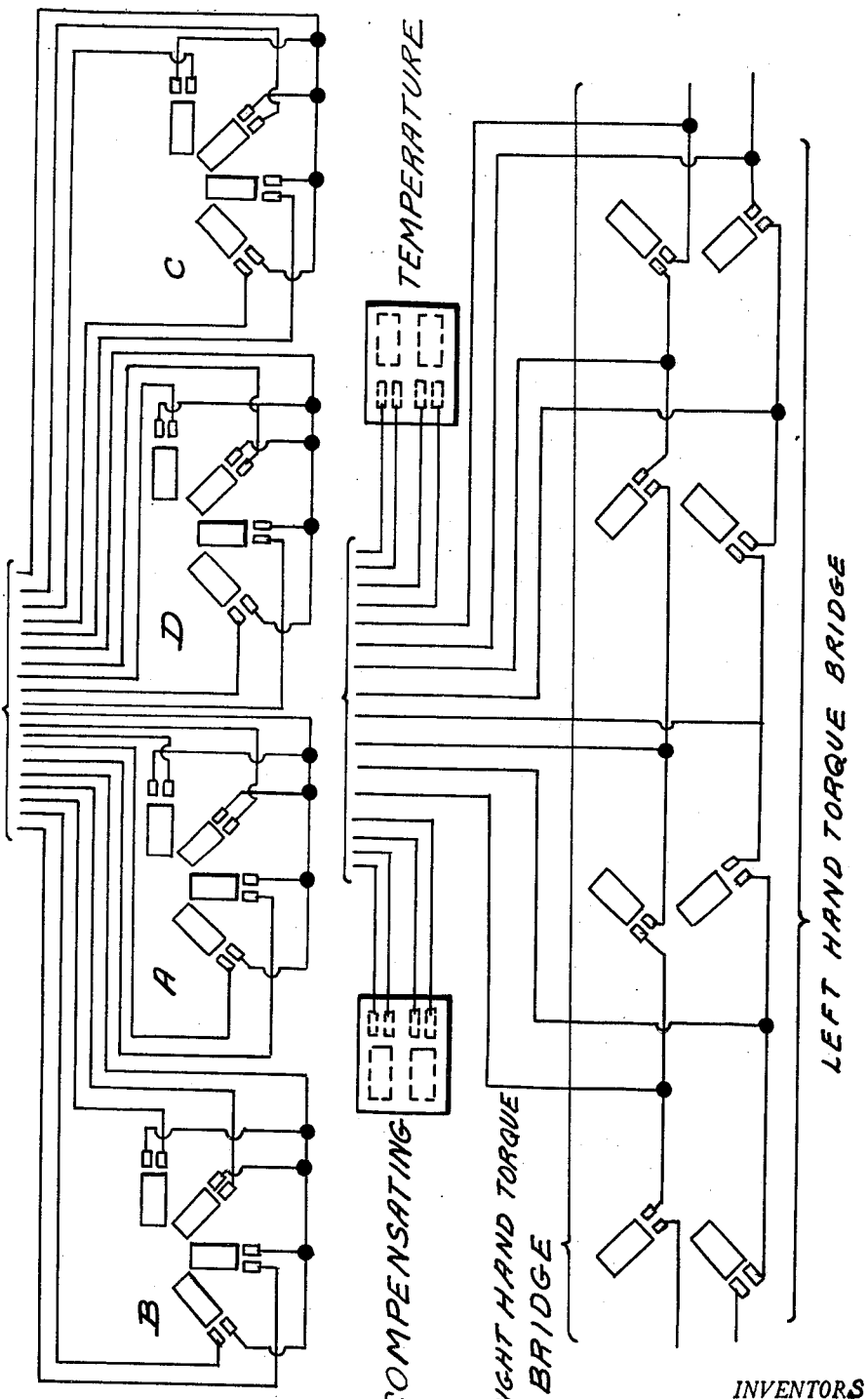

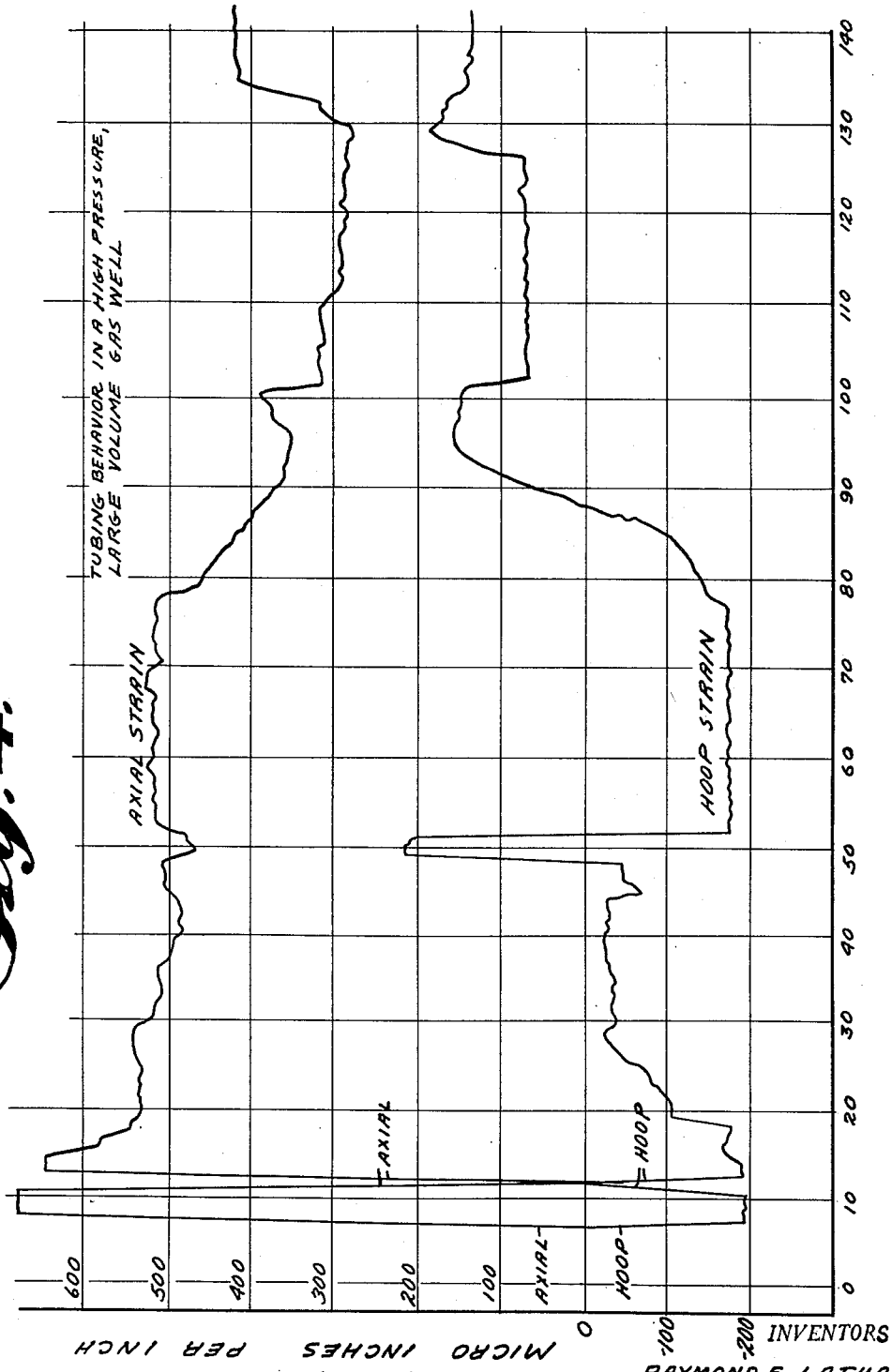

Feb. 3, 1970

R. E. LATHAM ET AL 3,492,866

WELL TUBING BEHAVIOR MEASUREMENT APPARATUS AND METHOD

Filed June 14, 1967

INVENTORS
RAYMOND E. LATHAM
OSCAR DANE III
BY CHARLES D. RATLIFF

Cushman, Darby & Cushman
ATTORNEYS

# United States Patent Office 3,492,866
Patented Feb. 3, 1970

3,492,866
WELL TUBING BEHAVIOR MEASUREMENT APPARATUS AND METHOD
Raymond E. Latham, Oscar Dane III, and Charles D. Ratliff, Houston, Tex., assignors to Gray Tool Company, Houston, Tex., a corporation of Texas
Filed June 14, 1967, Ser. No. 645,992
Int. Cl. E21b 47/00
U.S. Cl. 73—151                                  4 Claims

ABSTRACT OF THE DISCLOSURE

Semiconductor strain gauges for measuring axial and hoop strains, torque and temperature are attached to a sub incorporated in a tubing string of a high pressure, large volume gas well and connected through an outlet valve of the head to a feed-through hub provided with outlet pins. The latter are connected to a self contained, battery powered strain gauge bridge assembly, where readings are taken during final spacing out, initial phase of well cleanup and during other periods of well operation. Results are corrected for temperature and individual equipment characteristics and tabulated.

BACKGROUND OF THE INVENTION

Failures, such as parting, unscrewing of the tubing string and other phenomena continue to plague the production of oil and gas wells. Using prior art apparatus that has been available, it has not been possible to predict what effects the condition of a bore hole will have on the behavior of tubing strings incorporated in a well. It is fairly common in the oil well industry to find tubing strings that have become disconnected during production. Many theoretical calculations have been made under varying well conditions, and completions made in accordance with these considerations. However, leaks continue to occur in such high pressure-high rate gas wells indicating that prior art theoretical calculations may not have as much validity as some have ascribed to them. Accordingly, there has existed in the art a need for apparatus which could provide actual measurements of the physical behavior of production tubing under the conditions of high pressure and high volume gas flows both to aid in the evaluation of the correctness of particular completions and also to provide a fund of data that can be used by those skilled in the art to more intelligently design completions. For instance, if the proper amount of tension to be applied in hanging tubing can be determined for a particular well detrimental effects of thermalcycles, pressure cycles etc. for the well conditions can be minimized. For example, the reversal of stresses from tension to compression may eventually cause the fatigue failure of tubing. If the strain distribution can be determined, fixed, as a result of a particular completion procedure, this type of failure can be minimized.

SUMMARY OF THE INVENTION

According to the principles of the present invention, apparatus and a method are provided for taking actual measurements of physical behavior of the production tubing under the conditions of high pressure and high volume gas flows of a well. The indicated loadings on the tubing hanger are obtained by electrical resistance strain gauges mounted on a sub incorporated in the production string immediately below the tubing hanger. The strain gauge lead wires pass out through the tubing head side outlets to a null balance instrument at the surface. Accordingly, any change in the tensile load, internal or external pressure, or the applied torque on the tubing string can be immediately discerned at the surface through the use of the apparatus of the invention. Such data is most profitably collected during the tubing setting operation, completion, and flow testing of the well, including during the final stages of spacing out and the initial phase of well cleanup as well as at periods of known changes in well conditions.

Direct strain gauge measurements that have been made using the apparatus and method of the invention indicate that significant changes occur in hanger and packer loadings corresponding to the dynamic flow conditions of the well. With the knowledge provided through use of the apparatus and method of the present invention, producers may now take steps to reduce detrimental effects, such as high negative torque on the tubing, tending to back off the tubing. The effects of restricting the amount of production, pre-torqueing the tubing, increasing or decreasing the tubing tension, or providing freely rotatable well head equipment for hanging the tubing can now be accurately measured.

The invention may be best understood with reference to the accompanying drawings wherein a preferred embodiment is shown and the results are of an exemplary completion tabulated.

BRIEF DESCRIPTION OF THE DRAWING

FIGURE 2 is a longitudinal sectional view of the well head, with some parts not necessarily present for understanding of the invention omitted and other parts depicted schematically, showing a transducer installation for detecting and reporting tubing behavior in a high pressure large volume gas well;

FIGURE 2a is a schematic view of the transducer showing the orientation and position of the ten schematic strain gauges thereon as used in the example testing;

FIGURE 3 is a fragmentary longitudinal sectional view of the well head of FIGURE 1 showing a protective blanking hub secured over the pins of the electrical feed-through hub; and FIGURES 4 and 5 are graphs of tabulated and compensated results of a typical example of information provided through use of the detecting and reporting apparatus of FIGURE 1 on a well.

In FIGURE 1, a well head is generally indicated at 10 including a casing head 12 mounted on an outer string of casing 14. The next inner string of casing 16 is suspended from the bore of the casing head 12 via a hanger 18. A casing spool 20 mounted on the casing head 12 supports the upper end of an inner casing string 22 in the bore thereof via a hanger 24. A tubing head 26 is mounted on the spool 20 and in turn supports the remainder of the Christmas tree 27. The tubing head 26 includes smooth entry side outlets 28 intersecting the bore thereof and normally providing for the attachment of valves 30 and similar equipment to the tubing head. A string of tubing 32 is hung in the well from a tubing hanger 34 mounted in the throughbore of the tubing hanger.

Referring now to FIGURE 2, according to the present invention, the tubing string is provided with a calibrated tubing transducer 36. This transducer, when installed in the well, becomes a part of the tubing string. In the example shown, the transducer 36 comprises a double pin sub of four inch O.D. tubing that is three feet long. In FIGURE 2, the sub 38 is shown incorporated in the tubing string immediately beneath the tubing hanger. The sub 38 is instrumented by mounted on its exterior a plurality of electrical resistance type strain gauges 40. In the embodiment shown ten semi-conductor strain gauges were employed in the instrumentation each attached in the manner and orientation recommended in Semi-Conductor and Conventional Strain Gauges, Academic Press, New York City, 1962; and Semi Conductor Strain Gauge Handbook, Baldwin, Lima, Hamilton Electronics Division, Waltham, Mass., 1964. Waterproofing material and a hard outside covering 42 are applied to the sub over the strain gauges in order to protect them. The lead wires for the strain gauges are strung through one of the tubing head smooth entry outlets 28, through one of the outlet valves 30 and terminate in cable pull eyes 44.

Figure 1:
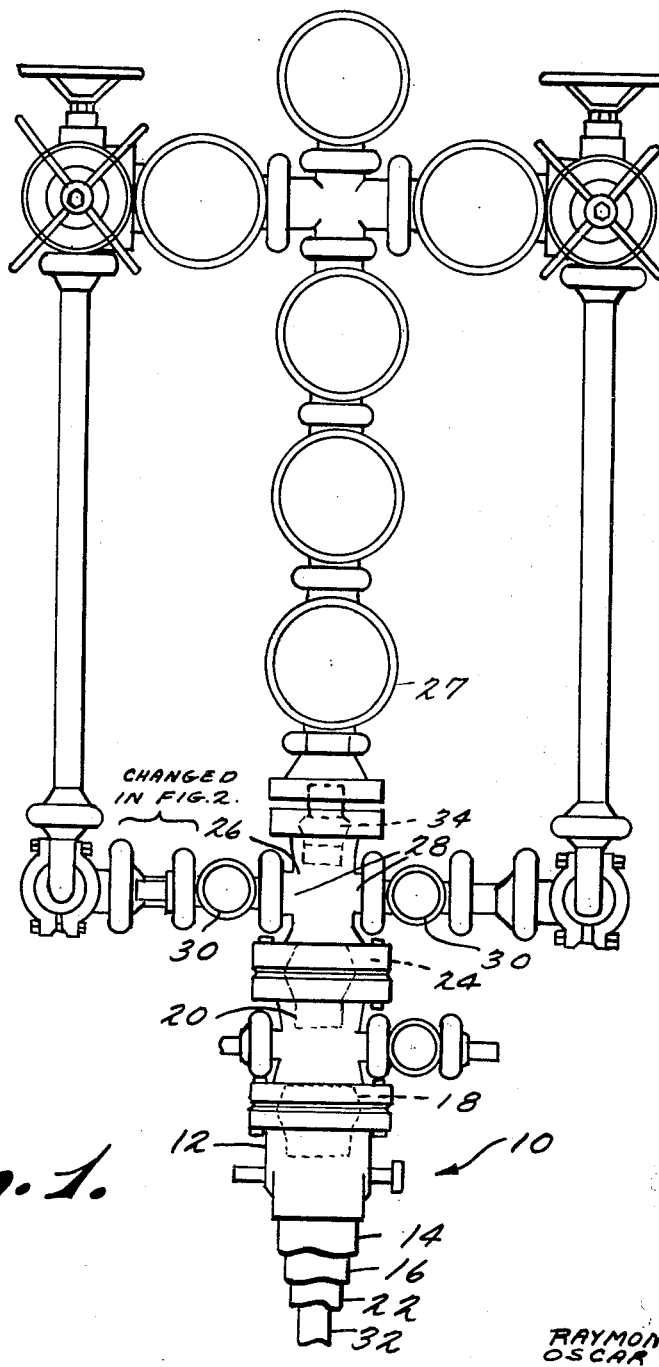
FIGURE 1 is a small scale side elevation view of a well head showing the general location of the equipment shown in more detail in FIGURE 2.

An electrical feed-through hub 46 is provided having axial recesses 48, 50 in the axially opposite ends thereof. Clamp receiving exterior circumferential flanges 52 are provided on the hub 46 adjacent each axial end thereof. A similar flange 52 is provided on the outer end of the valve 30. The mouth of the recess 48 and the outer end of the bore of the valve 30 are provided with peripheral frustoconically curved seats 54 for receiving an elastic hard metal deflectable lip sealing ring 56 such as is disclosed in U.S. Patent 2,766,829. A circumferential, segmental clamp 57 engages the flanges 52 drawing the parts 30, 46 axially toward one another establishing a seal at 54, 56 in the manner disclosed in the U.S. Patent of Watts et al., 2,766,999. The hub 46 is provided with a plurality of axially directed bores 58 which communicate between the recesses 48, 50. An electrical feed through unit 60 is sealingly received in each bore 58. Each unit 60 terminates in a pin 62 within the recess 48 and a pin 64 projecting outwardly of the recess 50. An external electrical lead line 66, for instance 100 feet long, has a first end provided with socket means 68 for removable connection to the pins 64. The other end of the cable 66 leads to a self-contained battery powered strain gauge bridge assembly 70 at the surface.

The instrument 70 is provided with switch means 72 for selectively connecting the various strain gauges to the bridge circuits of the instrument. The instrument 70 is also provided with a calibrated variable resistor 74 and a null balance meter 76.

Turning now to FIGURE 3, when readings are not to be taken from the strain gauges for a protracted period, the plug 68 of the cable 66 may be pulled from the pins 64 and a blank hub 78 having an external flange 80 clamped over the outer end of the feed through hub 46 and sealed thereto via a circumferential segmental clamp 57' and an elastically deflectable annular sealing ring 58' which seats against frusto-conical sealing surfaces 82, 84 at the mouths of the recesses 50, 86 in the adjacent ends of the hub 46 and blanking hub 78.

When readings are again to be taken, the blanking hub 78 is easily removed by expanding the clamp 57'. After the clamp 57' has been removed together with the blanking hub 78, the sealing ring 58' can be removed and the socket means 68 plugged into the pins 64.

In order to obtain meaningful readings from the apparatus shown in FIGURE 2, it is necessary to calibrate the transducer 36 with the instrument 70 by applying strains and torque of known magnitude to the transducer at various known temperatures. In this manner, temperature correction curves and plots of instrument dial units versus temperature, standard torque units, such as inch pounds or foot pounds and standard strain units such as micro-inches per inch, can be constructed. These plots allow easy conversion of instrument dial readings to accurate strain, torque and temperature values.

EXAMPLE

The electrical strain gauge system and calibrated tubing transducer of FIGURES 1 and 3 were used to collect data during the tubing setting operation, completion and flow testing of a high pressure, large volume off shore gas well in the Gulf of Mexico. Data was obtained under ten different conditions, to be explained, below in 150 runs, the results of which are tabulated in FIGURES 4 and 5. During the test, well head pressures (tubing pressures) were recorded into the field data from gauges attached to the well head. During flow testing of the well, accurate, direct readings of the tubing pressures were recorded from a dead weight tester.

Figure 5:
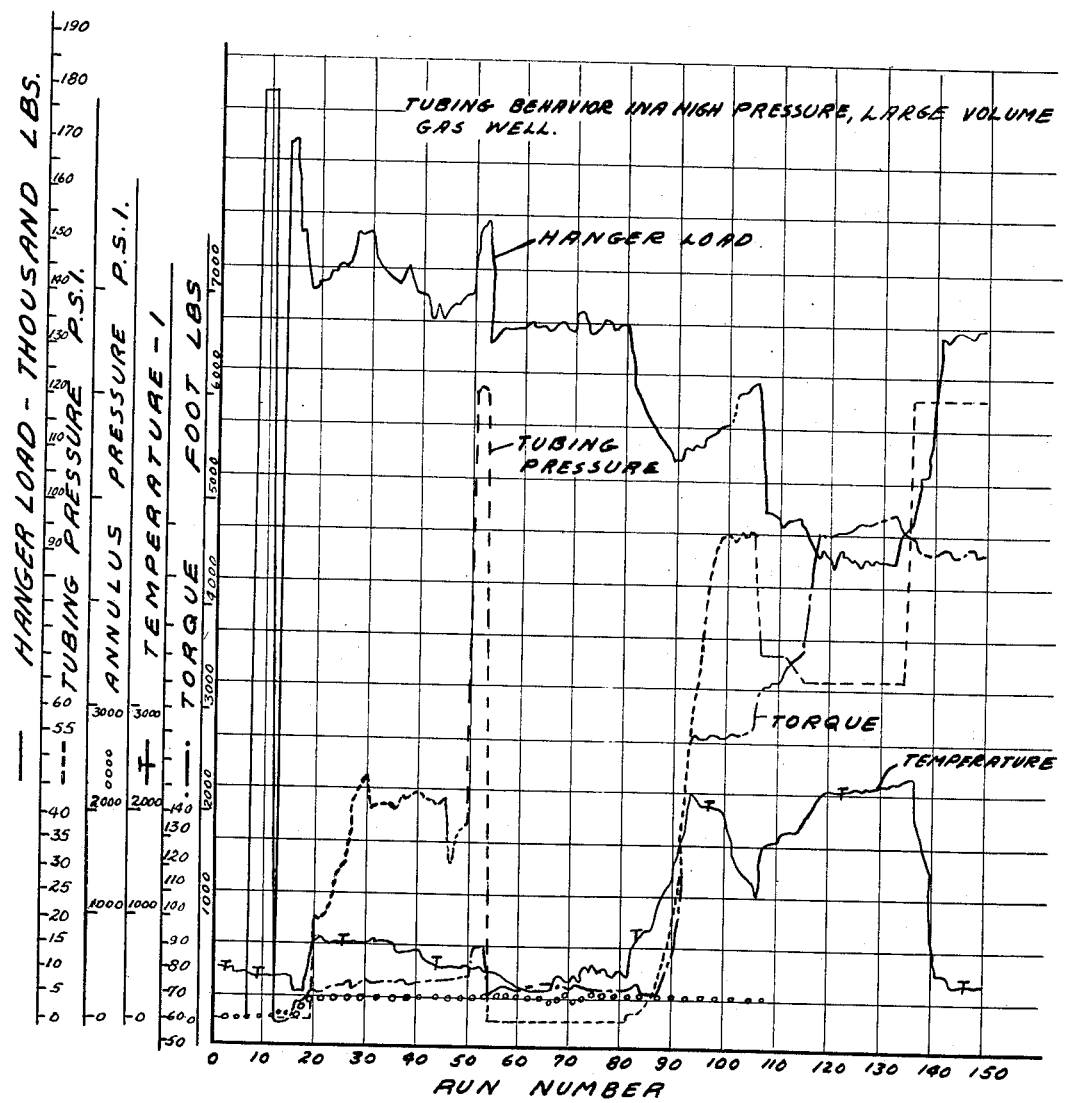

The following are the conditions under which the data corrected and reported in FIGURES 4 and 5 was obtained.

Condition No. 1 "Initial Zero" Runs 2–7 and 12

As the transducer was being set in the well, runs were made to obtain a field zero reference for use in interpreting the field data. The initial zero on the rig floor was taken to be an arithmatic average of all seven corrected readings for runs 2–7 and 12.

Condition No. 2 "Weight Coming Out of Hole"

Runs 8, 10 and 11.—The tubing was immersed in 11.5#/gal. mud and the block was lifting tubing out of the hole.

Average tubing weight at hanger _____lbs.__ 178,000
Length of tubing _____feet__ 15,832

Condition No. 3 "Weight Going Into Hole"

Runs 13, 14 and 15.—The tubing was immersed in 11.5#/gal. mud and the block had "slacked off" to allow tubing to drop back into hole.

Average tubing weight at hanger _____lbs__ 160,000
Length of tubing _____feet__ 16,832

Condition No. 4 "Packer Weight"

Runs 16 and 17.—Packer weight was assumed as being the difference between tubing weight going into well and the tubing weight set in Runs 16 and 17. Immediately after spacing, setting packer and hanging tubing, readings Nos. 16 and 17 were taken.

|  | Lbs. |
|---|---|
| Condition No. 3 weight | 169,000 |
| Average tubing weight set | 152,000 |
| Net packer weight | 17,000 |

Condition No. 4B "Packer Weight 7½ Hours Later"

Runs 18 and 19.—During a 7½ hour period, the preventers were removed and the Christmas tree was assembled and well head was tested. At the end of this period of time, the instrument was connected and readings 18 and 19 were made.

Condition No. 3 weight _____lbs__ 169,000
Average tubing weight Runs 18 and 19 ___lbs__ 141,000

Net packer weight 7½ hours later _lbs.__ 28,000

Annulus pressure _____p.s.i__ 222
Tubing pressure _____p.s.i__ 0
Torque (loosening joint) _____ft.-lbs__ 250

Condition No. 5 "Displacement of Tubing Mud"

Runs 20 through 53.—The elapsed time of this test condition was six hours. River water was pumped into the tubing, displacing mud from the annulus. Approximately 180 bbl. of 11.5#/gal. mud was displaced from the annulus during this period.

Runs 20 through 30:
    Tubing load at hanger _____lb__ 143,000–152,000
    Tubing pressure _____p.s.i__ 1,000–2,400
    Annulus pressure _____p.s.i__ 222
    Torque (loosening) _____ft.-lb__ 300–425
    Temperature _____° F__ 91
    Mud displacement _____bbl__ 0–171
    Time interval _____min__ 48
Runs 31 through 50:
    Tubing load at hanger _____lb__ 145,000–136,000
    Tubing pressure _____p.s.i__ 2,000–2,000
    Annulus pressure _____p.s.i__ 222

| | |
|---|---|
| Torque (loosening) ft.-lb | 400 |
| Temperature °F | 91–81 |
| Mud displacement bbl | 171–180 |
| Time interval hours | 4½ |

Runs 51 through 53.—Runs 51, 52 and 53 show a tubing pressure of 6,000 p.s.i. applied by the mud pump indicating that the packer side door was closed.

| | |
|---|---|
| Tubing load at hanger lb | 150,000–154,000 |
| Tubing pressure p.s.i | 6,000 |
| Annulus pressure p.s.i | 222 |
| Torque ft.-lb | 400–750 |
| Temperature °F | 81–82 |
| Mud Displacement | 0 |
| Time interval min | 4 |

Condition No. 6 "Swab"

Runs 54 through 90.—An attempt to bring the well in by releasing pressure on the tubing through well head was unsuccessful. The well was swabbed during Run No. 62 through Run No. 80. Run No. 81 is considered as the start of Condition No. 7 since this change occurred in the well about five minutes after the swab was removed for the last time.

| | |
|---|---|
| Tubing load at hanger lb | 133,000 |
| Tubing pressure p.s.i | 0 |
| Annulus pressure p.s.i | 262 |
| Torque (loosening) ft.-lb | 325 |
| Temperature °F | 72–82 |
| Time interval hours | 7 |

Condition No. 7 "Bring Well In"

Runs 81 through 92.—Water began flowing from the tubing. During Runs 90 through 92, gas was blowing out around the liquids flowing from the well.

| | |
|---|---|
| Tubing load at hanger lb | 132,000–109,000 |
| Tubing pressure p.s.i | 0–2,140 |
| Annulus pressure p.s.i | 262 |
| Torque (loosening) ft.-lb | 325–2,024 |
| Temperature °F | 79–134 |
| Time interval min | 28 |

Condition No. 8 "Flow Shut-In"

Runs 93 through 106.—Flow shut-in and connection was made to flow metering equipment. Hanger load was increasing and temperature was decreasing.

| | |
|---|---|
| Tubing load at hanger lb | 111,000–124,000 |
| Tubing pressure p.s.i | 2,600–4,700 |
| Annulus pressure p.s.i | 262 |
| Torque (loosening) ft.-lb | 2,800 |
| Temperature °F | 150–112 |
| Time interval min | 25 |

Condition No. 9 "26 MMSCFD Flow Test"

Runs 107–133.—Flow was resumed after one hour shut in. Note in FIGURE 4 that dead weight tubing pressures are plotted, since annulus pressures were not known during this portion of the test.

| | |
|---|---|
| Tubing load at hanger | 89,000 |
| Tubing D.W.T. | 3,360 |
| Annulus pressure | unknown |
| Torque (loosening) ft.-lb | 5,900 |
| Temperature °F | 154 |
| Time interval hours | 3 |

Condition No. 10 "Shut-In Pressure"

Runs 134 through 150.—The well was shut-in and data was taken over a 3½ hour period as the well cooled down. A storm choke was run into the well during this time.

| | |
|---|---|
| Tubing load at hanger lb | 95,000–134,000 |
| Tubing pressure p.s.i | 6,020 |
| Annulus pressure | Unknown |
| Torque (loosening) ft.-lb | 4,700–4,500 |
| Temperature °F | 156–76 |
| Time interval hours | 2½ |

It should be evident from the information set forth above under the various "Condition" headings and from the results plotted in FIGURES 4 and 5 that the present invention provides means and a method for obtaining reliable load, torque, temperature and pressure data from a tubing string during tubing setting, completion, flow testing and production, which data can be used in much more accurate analysis of variations in packer loads, stress analysis of tubing at the hanger and in design of tubing hanging and jointing means which will have less of a tendency to unscrew at high pressures and high flow rates.

An important product of the testing reported in this example was the discovery of a tendency of the tubing to become subject to positive torque of sufficient magnitude and direction to unscrew the tubing at the hanger at a flow rate of 26 MMSCFD. It also appeared that torque was a direct function of flow rate, which is contrary to what prior art indirect calculations previously predicted. It is believed that tubing behavior of this nature could explain the source of leaks in high pressure-high flow rate gas wells and that creation of a body of data utilizing the equipment and method of the present invention under diverse conditions upon wells of differing design and characteristics can advance the state of the art significantly in minimizing or preventing such leakage and other undesirable phenomenon.

From the above discussion and example the principles of the invention should be evident. Because the particular embodiment shown and described can be modified somewhat without departing from these principles, the present invention should be understood to encompass all such modifications as are within the spirit and scope of the following claims.

We claim:

1. A method for obtaining data from within a well as to at least one of load, torque, temperature and pressure conditions subjecting a well tubing string during at least one period of possible variations in at least one of the following operations upon said well tubing string and said well: tubing setting, completion, flow testing and production; said method comprising:
    (a) conducting one of said operations and concurrently sensing from within the well the torque on said tubing string therein while said well is in a first state of conditions of rate of fluid flow through said tubing, loading upon said tubing, pressure upon said tubing and continuing said sensing during said period; and
    (b) reporting the torque on said tubing string, sensed in step (a) during said period, exteriorly of the well.

2. In combination: a well head including a tubing head having a string of tubing hung therein via a tubing hanger; means defining a side outlet from said tubing head; a multi-conductor electrical feed-through hub operatively sealingly communicated at an inner end thereof with said tubing head side outlet; sub means incorporated in said tubing string adjacent the tubing hanger; a plurality of diversely oriented electrical resistance strain gauges secured to said sub means; an electrical conductor extending through said side outlet and operatively connecting each strain gauge to respective conductors of said feed-through hub at said inner end; each conductor of said electrical feed-through hub terminating in sealed outlet means on the outer end of said electrical feed-through hub to facilitate removable connection to an instrument constructed and arranged to detect and provide a measurement of the output of said strain gauges.

3. The combination of claim 2 further comprising a cover sealingly removably attached to the outer end of said electrical feed-through hub for protecting said conductor outlet means.

4. The combination of claim 2 wherein said electrical resistance strain gauges are semi-conductor strain gauges.

References Cited

UNITED STATES PATENTS 3,412,607 11/1968 Jensen _____ 73—155
2,392,293 1/1946 Ruge.
2,700,302 1/1955 Decker _____ 73—136
3,376,921 4/1968 Manry et al. _____ 73—151 X JERRY W. MYRACLE, Primary Examiner U.S. Cl. X.R.

166—250